United States Patent

[11] 3,594,623

| | | |
|---|---|---|
| [72] | Inventor | Donald M. Lamaster<br>Tustin, Calif. |
| [21] | Appl. No. | 19,170 |
| [22] | Filed | Mar. 13, 1970 |
| [45] | Patented | July 20, 1971 |
| [73] | Assignee | Borg-Warner Corporation<br>Chicago, Ill. |

[54] AC MOTOR CONTROL SYSTEM WITH ANTICOGGING CIRCUIT
8 Claims, 12 Drawing Figs.

[52] U.S. Cl. .................................................. 318/227, 318/230, 318/231
[51] Int. Cl. .................................................. H02p 3/40
[50] Field of Search ................................... 318/227, 230, 231

[56] References Cited
UNITED STATES PATENTS

| | | | |
|---|---|---|---|
| 3,402,336 | 9/1968 | Risberg | 318/227 |
| 3,482,157 | 12/1969 | Borden et al. | 318/227 |
| 3,500,158 | 3/1970 | Landav et al. | 318/227 |

*Primary Examiner*—Gene Z. Rubinson
*Attorneys*—Donald W. Banner, William S. McCurry and John W. Butcher

ABSTRACT: A motor control system including conventional components such as a volts/Hertz regulator to modify the inverter voltage amplitude, a logic stage to regulate inverter voltage frequency, and an oscillator for supplying timing pulses for the logic stage. To compensate undesired "cogging" at low operating frequencies, a square wave signal is produced and then integrated. An additional circuit is provided to incorporate additional phase shift in the signal which modulates the voltage passed from the inverter to the motor to prevent cogging. As the frequency of system operation increases, integration of the correction signal provides a modulating signal of decreasing amplitude. Thus the anticogging circuit is only effective at the lower end of the system operating range.

PATENTED JUL 20 1971

Inventor
Donald M. Lamaster

By James J. Jennings, Jr.
Attorney

Inventor
Donald M. Lamaster
By James J. Jennings, Jr.
Attorney

Inventor
Donald M. Lamaster
By James J. Jennings, Jr.
Attorney 3,594,623

1

AC MOTOR CONTROL SYSTEM WITH ANTICOGGING CIRCUIT

BACKGROUND OF THE INVENTION

AC motor control systems have been provided wherein the motor speed is accurately regulated by varying the frequency of the output voltage from the inverter which energizes the motor. For example a system may operate over a frequency of from 0 to 180 or 200 Hertz. At the low end of this range, up to 10 or 15 Hertz, there is a tendency for "cogging," or a jog-type incremental rotation of the motor each time the inverter output voltage is cycled. It is preferable to have a continuous, slow rotation of the motor at a speed dictated by the frequency of the inverter output voltage. Heretofore this has not been practical, with a compact and inexpensive control system.

It is therefore a principal consideration of this invention to provide a motor control system which virtually obviates cogging at the low frequency end of the system operating range.

SUMMARY OF THE INVENTION

An AC motor control system includes conventional means for establishing a train of pulses at a reference frequency to correspondingly regulate the frequency of the output voltage from the inverter which energizes the AC motor. Also provided is an inverter voltage modulating circuit, such as a volts/Hertz regulator.

The invention comprises a first circuit connected to provide a signal at the same frequency, but different in phase, as the train of pulses at the reference frequency. A second circuit, which is coupled to the first circuit, includes components for shaping the signal into a square wave and integrating the signal. A third circuit is coupled between the second circuit and the inverter voltage modulating circuit, to provide an additional phase shift. This arrangement ensures that the modulation of the inverter voltage is in the appropriate phase relationship with respect to the train of pulses at the reference frequency to obtain the desired anticogging effect.

THE DRAWINGS

In the several figures of the drawings like reference numerals identify like elements, and in the drawings:

FIG. 1 is a block diagram of a motor control system in which the anticogging circuit of this invention has been incorporated;

FIGS. 2a—2h are graphical illustrations useful in understanding operation of the invention; and FIGS. 3, 4, and 5 are schematic diagrams which together supply details of the anticogging circuit shown generally in FIG. 1.

DETAILED DESCRIPTION OF THE INVENTION

Figures 1, 2H:
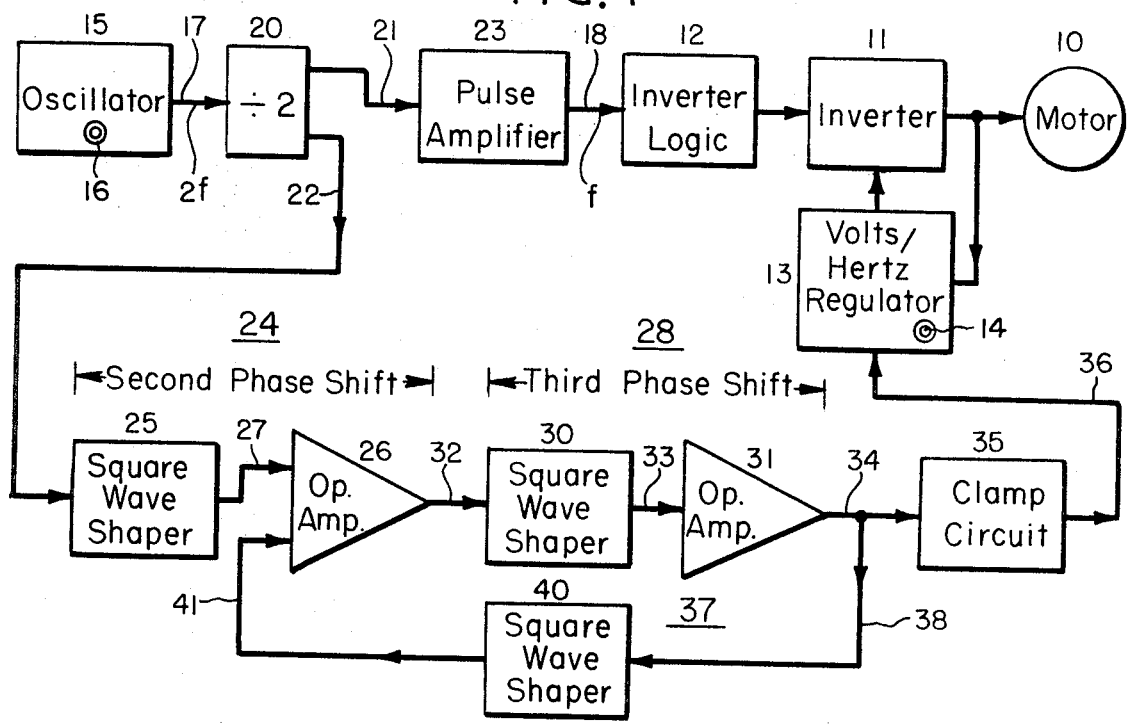

As shown in FIG. 1 an AC motor 10 is connected for energization by the output voltage supplied from an inverter 11. The frequency of the inverter output voltage, and thus the speed of the motor, is regulated by a train of timing pulses received from an inverter logic and driver stage 12. The amplitude of the inverter output voltage is generally regulated in some measure to maintain a preset amplitude/frequency ratio in the voltage applied to the motor, for reasons well known in this art. This can be accomplished by a modulating unit such as the volts/Hertz regulator 13, which includes a knob or adjusting means 14 for setting the desired voltage amplitude/frequency ratio. Also included is an oscillator 15 with an adjustable knob 16 for varying the frequency of the train of timing pulses provided on its output line 17.

The circuit components thus far described are conventional. In a system designed to regulate motor operation over a range, by way of example, from 0 to 200 Hertz, the oscillator 15 might normally be designed to operate from 0 to 1200

2

Hertz and provide its output signal over line 17 directly to the input line 18 of inverter logic stage 12. With a three-phase inverter circuit including six controllable rectifiers within inverter 11, logic stage 12 generally includes a divide-by-six circuit, so that each of the six rectifiers will be operated within the range of 0—200 Hertz.

In accordance with the present invention a circuit is provided and connected to modulate the inverter output voltage when the motor control system is operated at the low frequency end of the range. This low frequency portion may include, by way of example, from 0 to 15 Hertz in a system where the complete range of motor speed control is achieved with system operation from 0 to 200 Hertz. To provide this modulation, in the system of the preferred embodiment of this invention, a divide-by-two circuit 20 is provided, with its input circuit connected to receive the output pulses from oscillator 15 on line 17. The oscillator is adjusted to provide output pulses at twice the reference frequency, so that the output circuits 21 and 22 of stage 20 each provide a train of pulses at a reference frequency $f$, but these two pulse trains are displaced in phase relative to each other. The first train of pulses on output line 21 passes through a pulse amplifier 23 and over line 18, thus establishing a train of pulses at the reference frequency $f$ to regulate (through inverter logic stage 12) the frequency of the output voltage from inverter 11, correspondingly regulating the speed of motor 10.

The second train of pulses, on line 22, is passed to the input side of a second circuit 24. This circuit includes a square wave shaper circuit 25 coupled in series with an operational amplifier stage 26, connected as in integrator circuit. A third circuit 28, including another square wave shaper circuit 30 and another operational amplifier 31, is coupled in series between second circuit 24 and the inverter voltage modulating circuit 13. That is, the output signal from second circuit 24 is applied over line 32 to the square wave shaper stage 30, the output of which is coupled to operational amplifier 31. The output of unit 31 is applied over line 34, clamp circuit 35 and line 36 to volts/Hertz regulator 13. The clamp circuit 35 is not essential to effective operation of the invention, but finds utility during reversing of motor rotation. Likewise feedback circuit 37, which includes conductor 38 (coupled to output conductor 34 of operational amplifier 31), a square wave shaper circuit 40, and a conductor 41 (which is coupled to another input connection of op amp 26), enhances the accurate operation of the invention but is not basic to the production and utilization of the desired anticogging circuit.

Figure 2A:
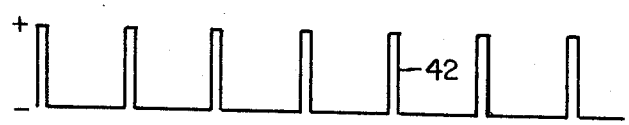
Figure 2B:
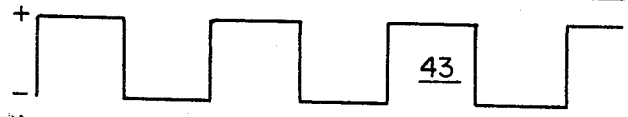
Figure 2C:
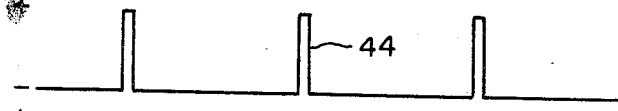
Figure 2D:
Figure 2E:

Describing the system of FIG. 1, the output pulses from oscillator 15 at frequency $2f$ are represented generally by 42 in FIG. 2a, and the operation of the divide-by-two circuit 20 is represented by the square wave 43 shown in FIG. 2b. The positive-going and negative-going portions of this signal are utilized to provide pulses at the reference frequency $f$, represented generally by the pulses 44 and 45 in FIGS. 2c and 2d. For purposes of this explanation, pulses 44 can be considered those applied over line 21 for passage through pulse amplifier 23 to the inverter logic stage 12. Pulses 45 are those passed over line 22 to the square wave shaper stage 25 at the input side of second phase shift circuit 24.

Figure 2F:
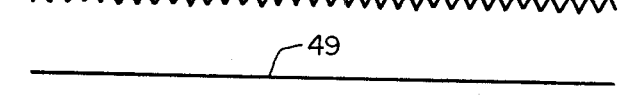
Figure 2G:
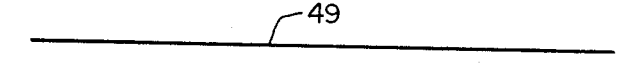
Figure 5:
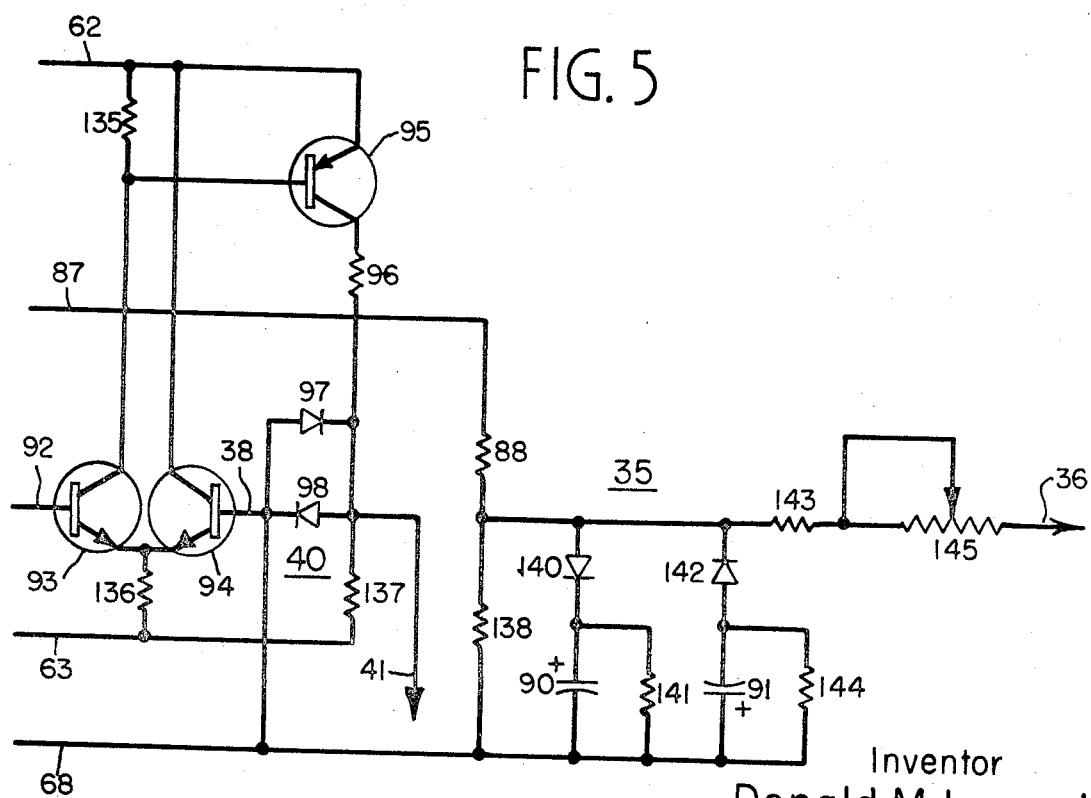

The square wave signal produced in stages 25 and 30 is integrated and, after passage over clamp circuit 35, is applied over line 36 to regulator 13. After integration the square wave signal resembles the signal 46 in FIG. 2e, at the lower frequency end of the system operating range, or some minimum frequency. FIGS. 2a—2e are shown in the appropriate phase relationships relative to each other. As the system frequency is raised to twice the minimum frequency, the output modulating signal is changed to that indicated by 47 in FIG. 2f. At five times the minimum frequency, the signal resembles that depicted by 48 in FIG. 2g. High frequency operation produces virtually an unchanging signal 49 as shown in FIG. 2h. With this perspective of the overall system and its operation, the corresponding portions of FIGS. 3—5 will now be described.

Figure 3:
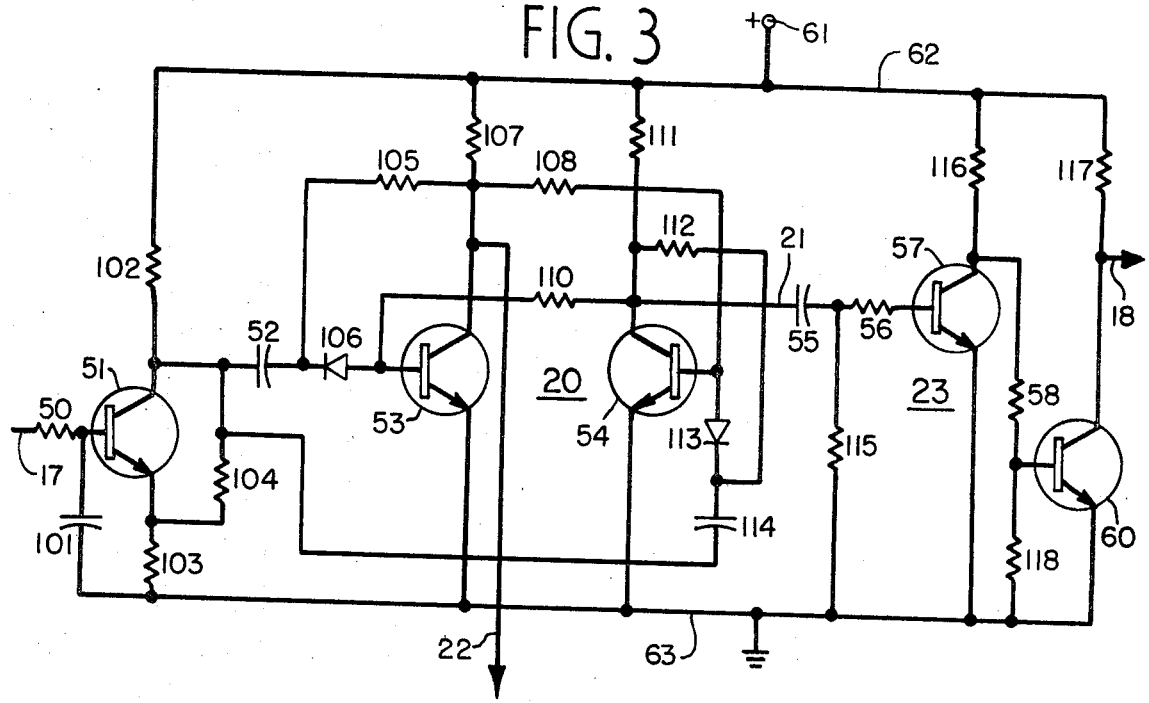
Figure 4:
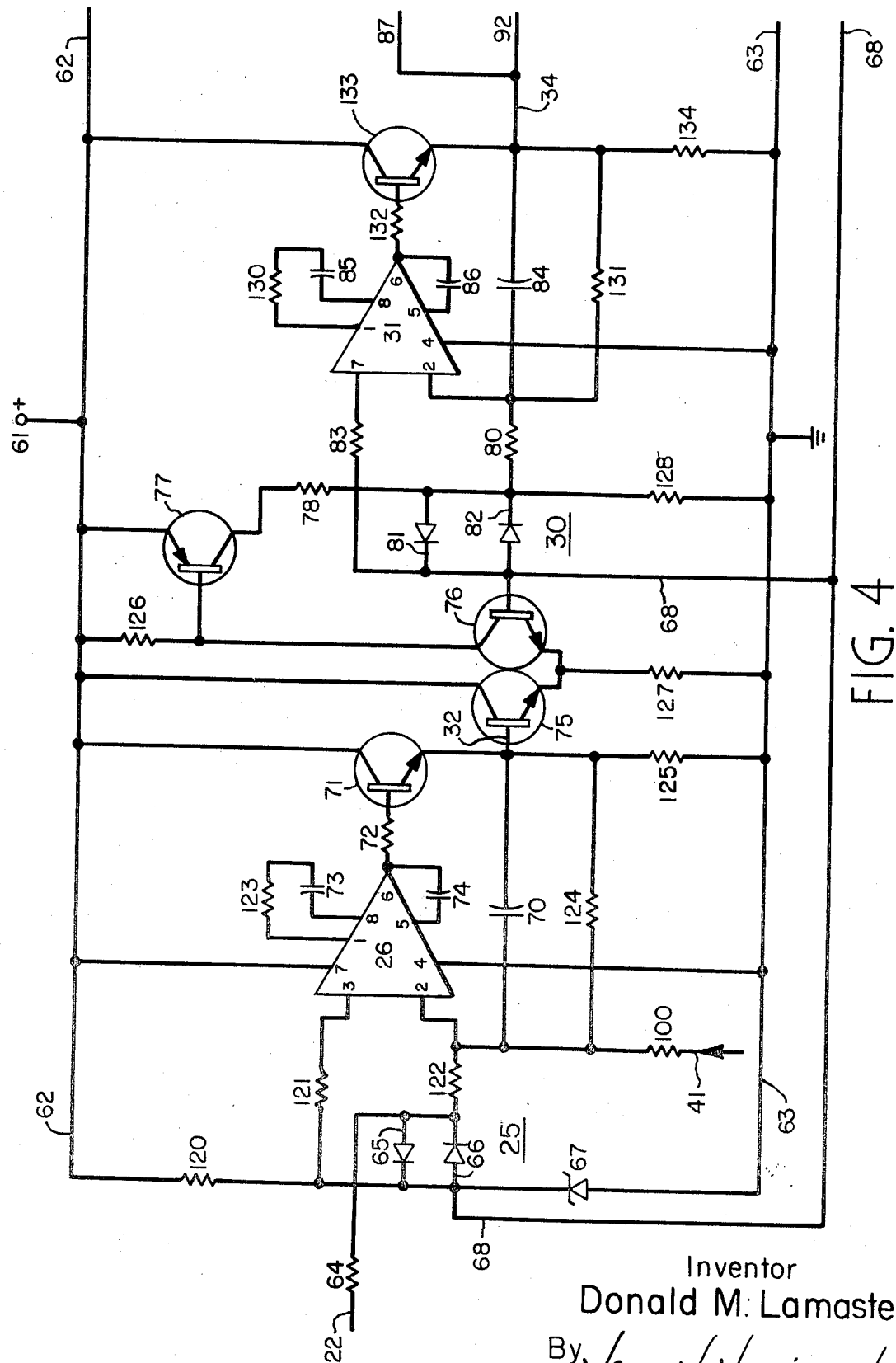

As shown in FIG. 3, the train of timing pulses at twice the reference frequency is applied over a resistor 50 to the base of an NPN type transistor 51 to gate this transistor on. Each turn-on provides a negative-going signal at the collector of transistor 51, which is applied through capacitor 52 to change the state of the flip-flop or divide-by-two circuit 20. Signals from the collector of an NPN-type transistor 53 in this flip-flop are passed over conductor 22 to the square wave shaper circuit 25 (FIG. 4). Signals from the collector of the other NPN-type transistor 54 in the flip-flop are passed over conductor 21, capacitor 55, and resistor 56 to the base of an NPN-type transistor 57 in the pulse amplifier stage 23. Output signals from the collector of this transistor are applied over resistor 58 to the base of an NPN-type transistor 60, and signals from the collector of this transistor are applied over conductor 18 to the inverter logic stage to effect inverter frequency control. The particular circuit of FIG. 3, the components of which will be identified hereinafter, was energized by the application of a DC potential of a positive 25 volts applied over terminal 61 to the conductor 62, relative to the potential on ground or reference conductor 63. The same energizing potential was utilized for the components of FIGS. 4 and 5.

Referring to FIG. 4, signals received from divide-by-two stage 20 over conductor 22 are applied over resistor 64 to one side of the diodes 65, 66 in square wave shaper 25. The other sides of these diodes are coupled to the cathode of a Zener diode 67, the anode of which is coupled to ground conductor 63. Accordingly a reference voltage level is established at the cathode of Zener diode 67, and is also utilized over conductor 68 in connection with the other square wave shapers 30 and 40. Clamping circuit 35 is also referred to the voltage on conductor 68, as will be seen in connection with FIG. 5.

Signals from stage 25 are integrated in op amp stage 26, which includes an integrating capacitor 70 coupled between connection 2 of the op amp and the emitter of another NPN-type transistor 71. The base of this transistor is coupled over a resistor 72 to output connection 6 of the op amp. Capacitors 73, 74 are connected as shown to modify the frequency response characteristic of this stage in a well-known manner.

Two NPN-type transistors 75, 76 are connected so that the output from the first shaper-and-integrator stage 24 is applied to the base of transistor 75, for comparison with the reference voltage on conductor 68 which is applied to the base of transistor 76. This comparison provides an output signal from a PNP type transistor 77 which is applied over resistor 78 to one side of the square wave shaper stage 30, and over resistor 80 to connection 2 of op amp 31. The other sides of diodes 81, 82 are coupled over resistor 83 to connection 7 of op amp 31. Capacitor 84 is the integrating capacitor of this stage. Capacitors 85, 86 are connected as shown to provide the desired frequency response characteristic of this stage. The output from this integrator stage is applied over conductor 34 and conductor 87, through a resistor 88 (FIG. 5) to one side of clamp circuit 35. This clamp circuit is provided so that, in those systems where the oscillator is shut off during motor reversal, the charged condition of capacitors 90 and 90 prevents the application of a large-voltage signal over conductor 36 to the volts/Hertz regulator. Accordingly the presence of the clamp circuit enhances operation of the anticogging arrangement but is not a requirement for its successful operation.

Again considering conductor 34, a portion of the output signal on this line is also applied over conductor 92 to the base of the first transistor 93 (FIG. 5) and the NPN pair 93, 94. In a manner similar to the comparison in circuit 75, 76, an output signal is provided over PNP-type transistor 95 and resistor 96 the one side of square wave shaper stage 40 which includes the diodes 97 and 98. The output signal from stage 40 is applied over conductor 41 (FIG. 5) and resistor 100 (FIG. 4) to input connection 2 of op amp 26. This signal minimizes the DC offset in the op amp stage 26. Other methods of compensating this stage might also be employed, and thus the feedback circuit described and illustrated is not a prerequisite to the successful operation of the anticogging circuit of this invention.

With this description of the general signal flow those skilled in the art can readily construct and operate an anticogging circuit for a motor control system. To minimize the experimentation and analysis required, a table of component identifications and values is set out below. This table is considered illustrative, and of assistance in constructing and operating a preferred embodiment of the invention, but is in no way a limitation on the scope of the invention.

| Component | Identification or Value | | |
|---|---|---|---|
| 26, 31 | Fairchild U5B770939X | | |
| 51, 53, 54, 57 | | | |
| 60, 71, 75, 76 | RCA 40500 | | |
| 93, 94, 133 | | | |
| 77, 95 | Fairchild 2N3638 | | |
| 67 | Motorola 1N4743 | | |
| 65, 66, 81, 82 | | | |
| 97, 98, 106, | GE 1N914 | | |
| 113, 140, 142 | | | |
| 52, 101, 114 | 0.0022 mf. | 100v. DC | |
| 70, 84 | 0.15 mf. | | |
| 90, 91 | 3.000 mf. | 3v. DC | |
| 55, 73, 74, 85, 86 | 0.001 mf. | 500v. DC, | 10% |
| 50, 108, 110, 126, | | | |
| 127, 135, 136 | 10 K | 0.5 w. | 10% |
| 120 | 680 ohms | 0.5 w. | 10% |
| 103 | 100 ohms | 0.5 w. | 10% |
| 56, 80, 83, 105, 112, | | | |
| 115, 121, 122, 143 | 22 K | 0.5 w. | 10% |
| 72, 78, 96, 107, 111, | | | |
| 125, 132, 134, 141, 144 | 2.2 K | 0.5 w. | 10% |
| 104 | 220 ohms | 0.5 w. | 10% |
| 118, 138 | 1 K | 0.5w. | 10% |
| 100 | 150 K | 0.5 w. | 10% |
| 58, 64, 88 | | | |
| 116, 128, 137 | 4.7 K | 0.5 w. | 10% |
| 102 | 820 ohms | 0.5 w. | 10% |
| 124, 131 | 1 M | 0.5 w. | 10% |
| 123, 130 | 1.5 K | 0.5 w. | 10% |
| 145 | 500 K | 2.0 w. | 20% |
| 117 | 1 K | 1.0 w. | 10% |

Although only a particular embodiment of the invention has been described and illustrated, it is apparent to those skilled in the art that various modifications and alterations may be made therein. It is therefore the intention in the appended claims to cover all such modifications and alterations as may fall within the true spirit and scope of this invention.

What I claim is:

1. An AC motor control system in which a train of pulses is established at a reference frequency for regulating the frequency of an inverter output voltage utilized to energize an AC motor, and in which an inverter voltage modulating circuit is provided, including the improvement which comprises
    a first circuit, connected to provide a signal at said reference frequency but differing in phase with respect to the train of pulses at the reference frequency,
    a second circuit, coupled to said first circuit, for shaping the signal into a square wave and integrating the signal, and
    a third circuit, coupled between the second circuit and the inverter voltage modulating circuit, for providing an additional phase shift, thus to ensure that the inverter voltage modulation is in the appropriate phase relationship with the train of pulses at the reference frequency.

2. An AC motor control system as claimed in claim 1, in which the inverter voltage modulating circuit includes a volts/Hertz regulator.

3. An AC motor control system as claimed in claim 2, and further comprising a claim circuit, coupled between said third circuit and the volts/Hertz regulator, to protect the system during removal of the train of pulses as the direction of motor rotation is reversed.

4. An AC motor control system as claimed in claim 1 in which each of said second and third circuits comprises a square wave shaper circuit, and an operational amplifier connected as an integrator circuit and coupled to the output side of the square wave shaper circuit.

5. An AC motor control system as claimed in claim 4, and further comprising a feedback circuit, coupled between the output side of the third circuit and an intermediate portion of the second circuit, to assist in minimizing the DC offset of the operational amplifier in the second circuit.

6. An AC motor control system as claimed in claim 5, in which said feedback circuit includes a square wave shaper circuit.

7. An AC motor control system as claimed in claim 1, and further comprising
   an inverter logic stage connected to receive the train of pulses at the reference frequency and to regulate the frequency of the inverter output voltage in accordance with the train of pulses,
   means for providing an additional train of pulses at a frequency twice the reference frequency, and
   a divide-by-two stage in said first circuit, having an input circuit connected to receive the additional train of pulses at twice the reference frequency, a first output circuit for passing a first train of pulses at said reference frequency toward the inverter logic stage, and a second output circuit connected to provide a second train of pulses at said reference frequency, but displaced in phase relative to the first train of pulses, to the input side of the second circuit.

8. An AC motor control system in which the output voltage from an inverter energizes an AC motor, an inverter logic stage is connected to regulate the frequency of the inverter output voltage, and a volts/Hertz regulator is connected to modulate the amplitude of the inverter output voltage, characterized by
   a divide-by-two circuit for receiving an input train of timing pulses and providing first and second trains of output pulses displaced in phase relative to each other,
   means, including a pulse amplifier circuit, for passing the first train of pulses from the divide-by-two circuit to the inverter logic stage,
   means, including a second circuit comprising a square wave shaper and an operational amplifier, for receiving the second train of pulses and producing an intermediate signal,
   a third circuit, comprising a second square wave shaper and a second operational amplifier, connected to add another phase shift into the intermediate signal,
   a clamp circuit connected to pass the intermediate signal from the second operational amplifier to the volts/Hertz regulator, and
   a feedback circuit, including a third square wave shaper circuit, coupled between the output side of the second operational amplifier and the input side of the first operational amplifier.

UNITED STATES PATENT OFFICE
CERTIFICATE OF CORRECTION

Patent No. 3,594,623　　　　　　　　　　Dated July 20, 1971

Inventor(s) Donald M. Lamaster

It is certified that error appears in the above-identified patent and that said Letters Patent are hereby corrected as shown below:

Column 4, line 67, "claim" should read -- clamp --.

Signed and sealed this 11th day of April 1972.

(SEAL)
Attest:

EDWARD M. FLETCHER, JR.　　　　　　　ROBERT GOTTSCHALK
Attesting Officer　　　　　　　　　　Commissioner of Patents